March 18, 1958   E. G. KOONS   2,826,829
FRACTION DEMONSTRATING DEVICE
Filed July 1, 1954

Evan G. Koons
INVENTOR.

BY
Attorneys

2,826,829
FRACTION DEMONSTRATING DEVICE

Evan G. Koons, Springfield, Pa.

Application July 1, 1954, Serial No. 440,638

1 Claim. (Cl. 35—31)

This invention relates to educational devices or teaching aids and for its primary object the provision of a compact and economically constructed teaching aid in the form of one or more sheets of material each conveniently configurated as a square to represent a unit and each additionally being sub-divided into two or more fractional parts of the unit and so identified either by color or by numerals or a combination of both with the parts so interconnected that they may be hinged with respect to each other so that one or any combination of parts may be disposed in face to face relation with the person using them so as to form an aid in teaching of fractions.

Another object of this invention resides in the provision of an improved teaching aid which is extremely compact and simple to use such that each individual person may be provided with one of the aids and thus may be more personally and effectively instructed thereby.

Still another object of this invention resides in the provision of improvements in teachings aids in which a rectangular sheet of material is provided to designate a unit and wherein one or more score lines are provided on the sheet to sub-divide the same into a plurality of fractional parts of the whole unit and wherein, additionally, one or more of the parts may be cut to further divide each individual part formed by the score lines into fractional portions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
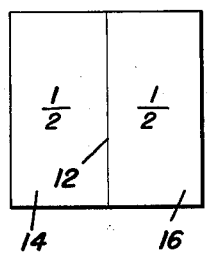
Figures 1-3 are plan views of exemplary forms of the invention.
Figure 2:
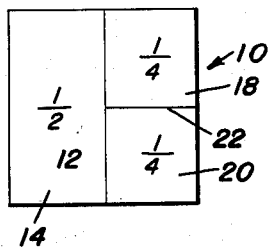
Figure 3:
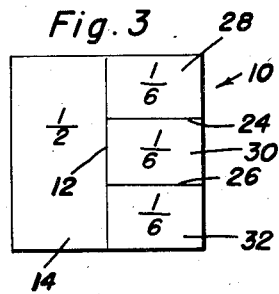
Figure 4:
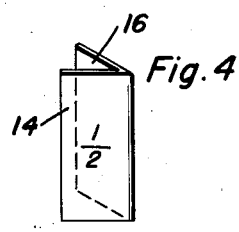
Figures 4-6 are perspective views illustrating the manner in which the devices shown in Figures 1-3, respectively, may be manipulated when used as a teaching aid.

Referring now more particularly to the drawings, and more specifically to Figures 1-3 and 7-9 thereof, the reference numeral 10 is utilized to indicate generally a rectangular sheet of material which in the preferred form is square in shape and each sheet is intended to represent a single unit easily identifiable by its square shape. Each sheet is provided with one or more score lines 12 which in the case of all of the examples shown in the drawings, divide the sheet into two equal halves, 14 and 16, which are suitably identified as to their fractional value of the whole sheet or unit either by suitable coloring, indicia or both.

Referring specifically to Figure 1, it will be readily observed that the sheet 10 depicted therein constitutes a very effective means for graphically illustrating the principle and operation of fractions. That is, in teaching a child or for that matter anyone to whom the use of fractions are to be taught, the entire sheet 10 very graphically illustrates the meaning of a whole unit in relation to fractional portions thereof which are equal to one-half of the total value of the unit. In this respect, it is to be understood that teaching aids such as those described herein are intended to be utilized in a classroom containing many students and it is to be further understood that each student, due to the inexpensiveness of the articles herein described, can be provided with an entire set of the teaching aids for his or her individual use. By bending back one portion of the sheet behind the remaining portion, the meaning and value of the fraction on one hand is very clearly illustrated particularly in view of the fact that the child or user readily identifies the square shape and particular size of the whole unit.

Figure 5:
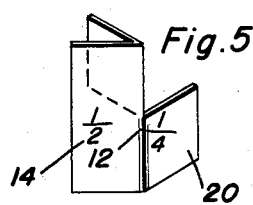
Figure 6:
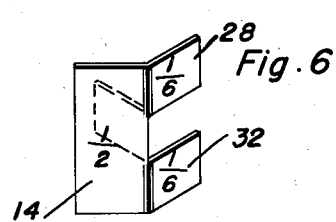

For illustrating smaller fractional portions then one-half, one portion of the sheet 10 may be sub-divided into two equal portions 18 and 20 each representing a quarter of the whole unit and so designated. These portions 18 and 20 are separated by slitting the sheet 10 along the line 22 such that the portions 18 and 20 may be individually folded with respect to the sheet as shown most clearly in Figure 5.

Still further values of fractions may be illustrated by the provision of a pair of slits 24 and 26 such that each portion 28, 30 and 32 divided from the half so slit represents one-sixth of the total unit.

Figure 7:
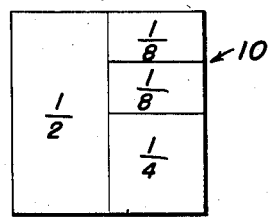
Figures 7-9 are plan views similar to Figures 1-3 but showing further forms of the invention.
Figure 8:
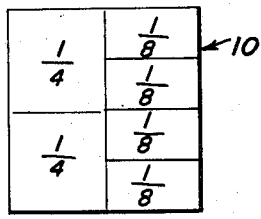
Figure 9:
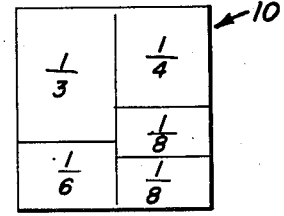
Figure 10:
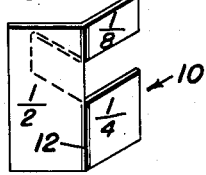
Figures 10-12 are perspective views of the assemblies shown in Figures 7-9 respectively illustrating their manner of use.
Figure 11:
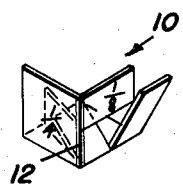
Figure 12:
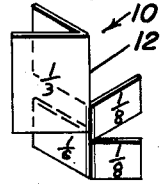

Of course, an infinite variety of sub-divisions of the entire unit may be effected by any desired combination of score lines and slits and only the more common forms are shown in the drawings, such as for example the forms shown in Figures 7-9 which are intended respectively to relate the fractions one-eighth, one-quarter and one-half, as well as the fractions one-eighth, one-sixth, one-quarter and one-third. These sheets may be folded or bent into various relationships dependent upon the relationship intended to be taught at any given time and Figures 10-12 are intended to show some of the forms which may be desired to use during certain specific lessons.

It is to be understood that the sheet members are preferably formed of some inexpensive but rather durable material such as plastic or the like and it is to be further understood that the main sub-division of the sheet may be formed by a hinge connection rather than a fold line as specifically shown and described without departing from the spirit of the invention.

It is to be understood that the principles of the invention, namely, the provision of a pupil manipulative device wherein each and every pupil may manipulate his own individual teaching aid so as to transform an abstract written or oral problem into concrete form, can be applied to other specific uses other than that described hereinabove. For example, a teaching aid for illustrating the relationship of fractions and percentages may be utilized. The overlying factor in any case resides in an individual aid wherein each pupil may visually and concretely relate certain entities, one to the other, so as to thoroughly and graphically group their related significance.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An educational device for teaching the fractional parts of a whole unit comprising a sheet of material representing a whole unit, a fold line dividing said sheet into fractional parts of the whole unit, indicia on at least one of said parts indicating the fractional portion of the whole unit which that part represents, at least one of said parts including a slit extending from a free edge thereof to the fold line thereby dividing said one part into a plurality of smaller fractional portions of the whole unit, indicia on each of the fractional portions indicating the fractional part of the whole unit of that fractional portion, said slit permitting the fractional portions of said one fractional part to fold along the fold line into overlying relation to the other fractional part thereby providing a visual comparison between the fractional portion and the other fractional part.

References Cited in the file of this patent

UNITED STATES PATENTS

| | | |
|---|---|---|
| 356,167 | Shannon | Jan. 18, 1887 |
| 480,119 | McCourt | Aug. 2, 1892 |
| 508,298 | Fulton | Nov. 7, 1893 |
| 1,479,147 | Markworth | Jan. 1, 1924 |

FOREIGN PATENTS

| | | |
|---|---|---|
| 8,118 | Great Britain | Apr. 4, 1906 |
| 167,194 | Switzerland | Apr. 16, 1934 |
| 393,900 | Germany | Apr. 11, 1924 |